United States Patent
Chrysanthakopoulos et al.

(10) Patent No.: US 12,403,719 B2
(45) Date of Patent: Sep. 2, 2025

(54) EFFICIENT INK ERASURE SYSTEM

(71) Applicants: SOCIÉTÉ BIC, Clichy (FR); BIC Violex Single Member S.A., Anoixi (GR)

(72) Inventors: Nikolaos Chrysanthakopoulos, Anoixi (GR); Guillaume Caffier, Clichy (FR)

(73) Assignees: SOCIÉTÉ BIC, Clichy (FR); BIC Violex Single Member S.A., Anoixi (GR)

(*) Notice: Subject to any disclaimer, the term of this patent is extended or adjusted under 35 U.S.C. 154(b) by 53 days.

(21) Appl. No.: 18/557,880

(22) PCT Filed: Apr. 28, 2022

(86) PCT No.: PCT/EP2022/061360
§ 371 (c)(1),
(2) Date: Oct. 27, 2023

(87) PCT Pub. No.: WO2022/229328
PCT Pub. Date: Nov. 3, 2022

(65) Prior Publication Data
US 2024/0227430 A1    Jul. 11, 2024

(30) Foreign Application Priority Data
Apr. 30, 2021   (EP) .................... 21305563

(51) Int. Cl.
| | | |
|---|---|---|
| *B43L 19/00* | (2006.01) | |
| *B43K 5/00* | (2006.01) | |
| *B43K 29/00* | (2006.01) | |
| *C09D 11/17* | (2014.01) | |

(52) U.S. Cl.
CPC ............ *B43L 19/0043* (2013.01); *B43K 5/00* (2013.01); *C09D 11/17* (2013.01); *B43K 29/00* (2013.01)

(58) Field of Classification Search
CPC ....... B43L 19/0043; B43K 5/00; B43K 29/00; C09D 11/17
USPC .................................. 401/52, 195
See application file for complete search history.

(56) References Cited

U.S. PATENT DOCUMENTS

| | | |
|---|---|---|
| 4,979,840 A | 12/1990 | Madaus et al. |
| 6,796,237 B2 | 9/2004 | Schuster et al. |
| 7,452,146 B2 | 11/2008 | Godbout |
| 9,365,051 B2 | 6/2016 | Saksa et al. |
| 2002/0074232 A1 | 6/2002 | Pinto et al. |
| 2004/0225032 A1 | 11/2004 | Spencer et al. |
| 2005/0158113 A1 | 7/2005 | Wehmeyer |
| 2007/0159517 A1 | 7/2007 | Hashimoto et al. |
| 2007/0228005 A1 | 10/2007 | Hasegawa et al. |
| 2011/0083912 A1 | 4/2011 | Liu et al. |
| 2014/0186529 A1 | 7/2014 | Sexton et al. |
| 2020/0001645 A1 | 1/2020 | Yano et al. |
| 2023/0357587 A1* | 11/2023 | Concedieu ............ C09D 11/17 |

FOREIGN PATENT DOCUMENTS

| | | |
|---|---|---|
| CN | 207319196 U | 5/2018 |
| JP | 0439100 A | 2/1992 |
| JP | H0959547 A | 3/1997 |
| JP | 2000506190 A | 5/2000 |
| JP | 2004130563 A | 4/2004 |
| JP | 2007090626 A | 4/2007 |
| JP | 4356437 B2 | 11/2009 |
| JP | 2015101087 A | 6/2015 |
| KR | 20110075396 A | 7/2011 |
| WO | 2012166160 A1 | 12/2012 |

OTHER PUBLICATIONS

Mathieu Valetaud, Gabriel Loget, Jérome Roche, Nina Hüsken, Zahra Fattah, et al . . . The EChemPen:A Guiding Hand To Learn Electrochemical Surface Modifications. Journal of Chemical Education,2015, 92 (10), pp. 1700-1704. ff10.1021/acs.jchemed.5b00149ff. ffhal-01216293.

Search Report and Written Opinion issued in International Application No. PCT/EP2022/061360, issued on Aug. 12, 2022.

* cited by examiner

*Primary Examiner* — David J Walczak
(74) *Attorney, Agent, or Firm* — Bookoff McAndrews, PLLC

(57) ABSTRACT

A system comprises a writing instrument. The writing instrument comprises an ink, wherein the ink comprises a coloring agent and a bonding agent. The adhesiveness of the bonding agent can be altered by applying a voltage or a voltage and a current. Further, the system comprises a writing surface comprising a first electrode and a second electrode or a writing surface comprising a first electrode and an erasing tool comprising a second electrode.

17 Claims, No Drawings

EFFICIENT INK ERASURE SYSTEM

CROSS REFERENCE TO RELATED APPLICATIONS

This is a National Stage Application under 35 U.S.C. § 371 of International Application No. PCT/EP2022/061360, filed Apr. 28, 2022, now published as WO 2022/229328 A1, which claims benefit to the European patent application 21305563.5, filed Apr. 30, 2021, its content being incorporated herein by reference.

TECHNICAL FIELD

The present invention relates to the field of writing devices. More specifically, the present invention relates to writing devices allowing the removal of ink.

BACKGROUND

A common problem with handwritten notes with a conventional ink delivery system is using an easy, efficient and non-destructive way to erase ink from the paper or the writing surface. Traditionally, a conventional ink erasure can be performed by eraser friction, wherein an eraser is rubbed against the paper or writing surface to remove the ink. However, the conventional ink erasure by friction is not efficient as ink marks may be left on the paper. Further, the friction during the erasure process may damage the paper or writing surface.

An alternative to conventional inks are thermochromic inks. Thermochromic inks change their color or turn transparent based on a change of temperature. In particular, thermochromic inks may become transparent when rubbed with an eraser by frictional heat and may only return to a colored state when cooled below ambient temperature. However, thermochromic inks may be expensive and their production may involve the use of toxic compounds, in particular melamine, formaldehyde and isocyanates. Also, the possibility to revert the thermochromic inks into a visible state by cooling the writing surface may not be suitable for certain applications.

Peelable inks are another alternative to conventional inks. Peelable inks commonly comprise pigments integrated into a rubber matrix. The rubber matrix may additionally comprise plasticizer for improved pliability. Further, peelable inks may comprise light solvents to form a mixture that is applicable to a writing surface, while still exhibiting a high viscosity. The light solvents may quickly evaporate when the peelable ink is applied to a writing surface and due to the high viscosity and a low affinity to the paper, the ink does not penetrate into the paper fibers. After drying the ink may be removed by peeling. However, these peelable inks may also be expensive. In particular due to the volatile nature of the solvents, the peelable inks may not be stored in conventional pen systems but require the use of more expensive pressurized cartridges. Further, peelable inks require a trade-off between a low adhesion, leading to easy erasability but an increased risk of accidental removal, and a high adhesion, leading to difficult or incomplete erasability but reducing the risk of accidental removal.

The present disclosure aims to address one or more of the problems in the prior art.

SUMMARY

According to a first aspect, the present disclosure relates to a system comprising a writing instrument. The writing instrument comprises an ink, wherein the ink comprises a coloring agent and a bonding agent. The adhesiveness of the bonding agent can be altered by applying a voltage or a voltage and a current. Further, the system comprises a writing surface comprising a first electrode and an erasing tool comprising a second electrode.

In some embodiments the applied voltage may be between about 0.01 V to about 48 V, more specifically between about 0.1 V to about 12 V, and in particular between about 1 V and about 3 V.

In some embodiments the writing surface may be at least partially electroconductive.

In some embodiments an electrochemical oxidation of the bonding agent may lead to a reduction of its adhesiveness.

In some embodiments the bonding agent may comprise a catechol and/or a catechol derivative, in particular dopamine, polymerized dopamine, dopamine methacrylamide or acetyl dopamine.

In some embodiments the coloring agent may comprise a dye, in particular a dye which may form a salt with the bonding agent.

In some embodiments the ink may comprise a solvent, the coloring agent may comprise a pigment, and the pigment may be embedded within the bonding agent after evaporation of the solvent.

In some embodiments the switchable mechanism may be configured to send a signal to the control system to switch on the application of a voltage or voltage and current to the electronic circuit when the switchable mechanism is actuated.

According to a second aspect, the present disclosure relates to a system comprising:
a writing instrument comprising an ink,
wherein the ink comprises a coloring agent and a bonding agent,
wherein the adhesiveness of the bonding agent can be altered by applying a
voltage or a voltage and a current; and
a writing surface comprising a first electrode and a second electrode.

In some embodiments the system may comprise a multiplicity of first electrodes and second electrodes, wherein the electrodes are configured to apply voltage or voltage and current to the writing surface or parts thereof. The multiplicity of first electrodes and second electrodes may be in particular in the form of micropins distributed in the writing surface.

According to a third aspect, the present disclosure relates to an erasing tool comprising an electrode and an electrical power source, wherein the erasing tool is configured to apply voltage or voltage and current to a writing surface.

According to a fourth aspect, the present disclosure relates to a writing instrument comprising an ink, wherein the ink comprises a coloring agent and a bonding agent, wherein the adhesiveness of the bonding agent can be altered by applying a voltage or a voltage and a current.

According to a fifth aspect, the present disclosure relates to an ink, wherein the ink comprises a coloring agent and a bonding agent, wherein the adhesiveness of the bonding agent can be altered by applying a voltage or a voltage and a current.

According to a sixth aspect, the present disclosure relates to a writing surface, wherein the writing surface comprises an electrode and wherein the writing surface is at least partially electroconductive, wherein the writing surface is configured to allow reversible adhesion of a bonding agent.

DETAILED DESCRIPTION

Hereinafter, a detailed description will be given of the present disclosure. The terms or words used in the description and the aspects of the present disclosure are not to be construed limitedly as only having common-language or dictionary meanings and should, unless specifically defined otherwise in the following description, be interpreted as having their ordinary technical meaning as established in the relevant technical field. The detailed description will refer to specific embodiments to better illustrate the present disclosure, however, it should be understood that the presented disclosure is not limited to these specific embodiments.

The present disclosure relates to a new principle of removing ink from a writing surface by providing a ink endowed with adjustable adhesiveness to the writing surface. The ink comprises dyes and/or pigments and a bonding agent. The bonding agent may be considered as a "smart" bonding agent in that it is characterized by exhibiting adjustable adhesiveness. Said adjustable adhesiveness (to the writing surface) is based on an external stimulus and application of said stimulus may adjust the adhesiveness and facilitate removal of the ink from the writing surface.

According to one embodiment, the ink may be initially applied to a writing surface and adheres to it, for instance after drying of its volatile components (such as a solvent). The ink is subsequently removable by applying an external stimulus. The external stimulus may in particular be the application of a voltage or a voltage and current and changes the adhesiveness of the bonding agent. Without wishing to be bound by theory, one exemplary ink is described below: The ink comprises a hydroxyl-group-rich binding agent (monomeric, oligomeric or polymeric). The hydroxyl groups may facilitate adhesion to the writing surface as in conventional adhesives (for instance, by facilitating the formation of hydrogen bridges). The application of a voltage or voltage and current as the external stimulus may lead to (local) oxidation, oligomerization, polymerization and/or cross-linking reactions which reduce the number of hydroxyl groups in the binding agent and, thus, its potential to form hydrogen bridges with the writing surface. As a result, the binding agent may exhibit a reduced adhesiveness compared to its initial state. Other reaction pathways may be possible. Other reaction systems may also be possible, for instance a system utilizing thiols and their oxidation to disulfides system or a system which is based on an initial adhesion to the writing system provided by formation of disulfide bonds between the writing surface and the bonding agent and an erasing step which reduces the disulfide bonds to thiols.

Accordingly, in a first aspect, the present disclosure relates to a system comprising a writing instrument. The writing instrument comprises an ink, wherein the ink comprises a coloring agent and a bonding agent. The adhesiveness of the bonding agent can be altered by applying a voltage or a voltage and a current. The further comprises a writing surface comprising a first electrode and an erasing tool comprising a second electrode.

A system according to the first aspect may be operated by using the writing instrument to distribute the ink on the writing surface. The bonding agent bonds to the writing surface and the coloring agent. As a result the coloring agent is bound to the writing surface via the bonding agent. To remove the ink, the erasing tool may be placed on the writing surface, in particular on the ink that shall be removed. Then a voltage or voltage and current is applied between the first electrode comprised within the writing surface and the second electrode placed within the erasing tool, thus the voltage or voltage and current is also applied to the writing surface and in particular, also to ink placed between the first and second electrode. The application of the voltage or the voltage and current to the ink may reduce the bonding agent's adhesiveness, which may facilitate removing the ink subsequently.

In some embodiments the first electrode may be a cathode, and the second electrode may be an anode. In some embodiments the first electrode may be an anode, and the second electrode may be a cathode.

In some embodiments the applied voltage may be between about 0.01 V to about 48 V, more specifically between about 0.1 V to about 12 V, and in particular between about 1 V and about 3 V.

A higher voltage may lead to a more efficient alteration of the bonding agent's adhesiveness. In particular, some bonding agents may require a minimum voltage to oxidize and/or cross-link. A higher voltage may also lead to a quicker alteration of the bonding agent's adhesiveness, compared to a lower voltage or voltage and current. On the other hand, higher voltages may increase the risk of the user being exposed to an electrical shock or unpleasant sensation.

In some embodiments the first and or second electrode may be a metallic electrode, a carbon-based electrode, a ceramic electrode or a polymeric electrode.

In some embodiments the writing surface may be at least partially electroconductive.

The writing surface may be partially electroconductive to conduct electricity between the electrodes. In particular, parts of the writing surface which are intended to come in contact with the ink may be electroconductive, so electricity can be conducted between the two electrodes and through the applied ink.

In some embodiments the writing surface may be a porous writing surface configured to receive the ink comprising the coloring agent and the bonding agent. In some embodiments the writing surface may comprise a paper. In some embodiments the paper may be electroconductive.

In some embodiments the writing surface may comprise a first electroconductive layer and a second non-conductive layer. In some embodiments the first layer may be a coating applied to the second layer or the first layer is bonded by an adhesive layer to the second layer.

In some embodiments the writing surface may comprise a thermoplastic polymer, a duromer, wood, cellulose, glass, ceramic, carbon, metal or a combination thereof. In some embodiments the first layer may comprise a metal, an electroconductive polymer and/or an electroconductive ceramic. In some embodiments the first layer may comprise a polymer film, in particular a polypropylene-based film, or a metallic film, in particular an aluminum film.

In use the first layer may be the layer to which the ink is applied. The first layer may therefore be considered to be a top layer and the second layer may be considered to be a base layer. Further, the first layer may have a direct or indirect electrical contact to the first electrode comprised in the writing surface. When the user wants to remove the ink, the user may place the erasing tool upon the writing to be erased and the voltage or voltage and current is applied between the first and the second electrode. The first layer comprising an electroconductive material would close the electronic circuit between the electrodes and the voltage or voltage and current would be applied to the writing between the erasing tool and the first layer.

The second layer may act as an electrical insulation. The second layer may insulate other parts of the system from the voltage or voltage and current applied to the first layer. The second layer may also provide physical support, e.g. by serving as a backing layer for the first layer.

A first layer comprising an electroconductive paper may provide a more conventional writing experience to the user. However, an electroconductive paper may be less durable compared to other materials, e.g. polymers, ceramics or metals. Further, the ink may penetrate into the wood fibers present in paper, leading to a less efficient and thorough removal of ink after the application of voltage or voltage and current.

A first layer comprising an electroconductive polymer, metal or ceramic may provide a more durable writing surface. Further, a first layer comprising an electroconductive polymer, metal or ceramic may allow for a more efficient removal of ink after application of voltage or voltage and current.

In some embodiments the writing surface may be at least partially electroconductive when applying a voltage of between about 0.01 V to about 48 V, more specifically between about 0.1 V to about 12 V, and in particular between about 1 V and about 3 V.

In some embodiments the writing surface may be comprised within a writing board.

The writing board may encase the writing surface from one or more sides not intended to be written upon. The writing board may structurally support the writing surface by providing a rigid encasing. The writing board may also incorporate auxiliary elements of the writing surface or the system, e.g. means to provide power to the system or a mounting bracket to attach the system to a wall.

In some embodiments the ink may comprise a solvent. The bonding agent and coloring agent may form a solid mixture or a mixture with a high viscosity. A mixture that is solid or has a high viscosity may not be applicable to the writing surface by a writing instrument, more particular it may not wet the surface sufficiently well to adhere to the surface. A solid mixture or a mixture with a high viscosity may form clumps on the writing surface during the writing action, as opposed to providing an evenly distributed line. The solvent needs to be compatible with the bonding agent and coloring agent to form a solution or a homogenous dispersion.

In particular, for a bonding agent or coloring agent in the form of one or more salts or solid polar chemical compounds, a solvent configured to dissolve salts or polar chemical compounds, may be added to the ink, in particular a polar solvent. For liquid salts or polar chemical compounds, a solvent with high miscibility with liquid salts or polar chemical compounds may be added to the ink, in particular a polar solvent.

For a bonding agent or coloring agent in the form of a solid non-polar chemical compound, a solvent configured to dissolve non-polar chemical compounds, may be added to the ink, in particular a non-polar solvent. For a bonding agent or coloring agent in the form of a liquid non-polar chemical compound, a solvent with a high miscibility with non-polar chemical compounds, may be added to the ink, in particular a non-polar solvent.

The solvent may be volatile. After application the concentration of solvent in the ink may decrease by evaporation. As a result, the viscosity of the ink may increase, or the ink may attain a solid form.

In some embodiments the bonding agent may be configured to adhere to the writing surface when the solvent evaporates. The bonding agent may have a higher affinity to the solvent compared to the writing surface or other surfaces. This may prevent the bonding agent and in effect the ink from adhering to surfaces, e.g. to its container, which may be an ink cartridge according to an embodiment. When the solvent evaporates, the bonding agent may adhere to the writing surface.

In some embodiments the solvent may be selected from water, phenoxy ethanol and benzyl alcohol.

In some embodiments the adhesiveness of the bonding agent can be reduced by applying a voltage or a voltage and current. In some embodiments the bonding agent may be oxidized by applying a voltage or a voltage and current. In some embodiments an electrochemical oxidation of the bonding agent may lead to a reduction of its adhesiveness.

In some embodiments the bonding agent may crosslink by applying a voltage or a voltage and current.

In some embodiments oxidative cross-linking (of monomers, oligomers or polymers) in the bonding agent may lead to a reduction of its adhesiveness.

In some embodiments the bonding agent may comprise hydroxyl-groups and the oxidation of the hydroxyl-groups reduces the bonding agent's adhesiveness. The oxidation described above may also occur on hydroxyl-groups comprised within the bonding agent. Without wishing to be bound by theory, hydroxyl-groups may provide adhesiveness as they are able to form hydrogen bridge bonds. The oxidation of hydroxyl-groups may lead to the formation of aldehydes and ketones and ester groups which are incapable or less capable of forming hydrogen bridge bonds.

In some embodiments the bonding agent may comprise a catechol and/or a catechol derivative, in particular dopamine, polymerized dopamine, dopamine methacrylamide or acetyl dopamine.

In some embodiments the bonding agent may comprise thiols and/or disulfides.

In some embodiments the ink may comprise a dye, more specifically a water-soluble dye or a dye soluble in organic solvent(s).

In some embodiments the dye may be chemically bound to the bonding agent. The dye may be in particular, but not limited to, basic violet 1, basic violet 3, basic violet 4, basic red 1, acid yellow 23 and/or acid yellow 36.

In some embodiments the dye and the bonding agent may form a salt. The salt may be formed by adding an anionic dye to a cationic bonding agent, in particular a cationic catechol. The salt may then precipitate and can subsequently be isolated from the water. Alternatively or additionally, a cationic dye may be added to an anionic bonding agent, in particular a cationic catechol.

In some embodiments the ink may comprise a pigment.

In some embodiments the pigment may be embedded within the bonding agent after drying of the ink. The type of pigment is not particularly limited.

In some embodiments the ink may comprise a solvent, a thickening agent, a gelling agent, and a dye and/or a pigment. In some embodiments the ink may comprise a resin and/or lubricant. Auxiliary components may be added to the ink to provide certain properties to the ink. A lubricant may for example improve the rollability of a ball point pen.

In some embodiments the system may further comprise a power source, in particular an electrical power source. The power source, in particular an electrical power source, may provide the voltage or voltage and current for the system to alter the adhesiveness of the bonding agent. Furthermore, the power source may provide power to auxiliary components comprised within the system, e.g. a display.

In some embodiments the electrical power source may be an electric battery, in particular a primary or a secondary battery. A primary or secondary battery may provide the system with electrical power, while allowing non-stationary use.

In some embodiments the electrical power source may be an electric power supply. In some embodiments the electric power supply may be connectable to a power grid. A system with an electric power supply may be cheaper to manufacture and/or more lightweight, compared to a system comprising a primary or secondary battery. Additionally, a system may comprise an electric power supply and a secondary battery, wherein the secondary battery may be recharged by the electric power supply.

In some embodiments the system may comprise an electronic circuit, wherein the writing surface, the first electrode and the second electrode are part of the electronic circuit and wherein the voltage or voltage and current is applied to the electronic circuit or parts thereof.

In some embodiments the system may comprise a control system configured to adjust the applied voltage or voltage and current. Adjusting the applied voltage or voltage and current may refer to turning the voltage or voltage and current on and off. Adjusting the applied voltage or voltage and current may also refer to increasing or reducing the voltage and/or current. The switchable mechanism may therefore provide control over the alteration of the bonding agent's adhesiveness.

In some embodiments the control system may be configured to adjust the voltage or voltage and current applied to the electronic circuit or parts thereof.

In some embodiments the erasing tool may comprise a switchable mechanism configured to send a signal to the control system to adjust the applied voltage or voltage and current when the switchable mechanism is actuated. Such a switchable mechanism may in particular send an electronic signal or an electromagnetic signal. An electromagnetic signal may have the advantage of not requiring the switchable mechanism to be directly connected to the rest of the system. The switchable mechanism may send a digital signal or an analogue signal. The switchable mechanism may comprise components such as a central processing unit, a main memory and or I/O circuitry, to process input values.

In some embodiments the switchable mechanism may be configured to send a signal to the control system to switch on the application of a voltage or voltage and current to the electronic circuit when the switchable mechanism is actuated.

In some embodiments the switchable mechanism may be configured to close the electronic circuit when the switchable mechanism is actuated and wherein the closure of the electronic circuit leads to application of the voltage or voltage and current.

In some embodiments the switchable mechanism may comprise a button. In some embodiments the button may be configured to be switched by an extremity of the user, in particular a finger or the palm of the hand. Controlling the switchable mechanism with an extremity, in particular controlling a button with a finger or the palm of the hand, may facilitate the alteration of the bonding agent's adhesiveness by the user. According to some embodiment, the user may place the erasing tool on the writing surface and only switch the switchable mechanism when the electrode is contact with the specific area of the ink that shall be altered.

In some embodiments the switchable mechanism may comprise a sensor, wherein the sensor is configured to send a signal to adjust the applied voltage or voltage and current to the control system when the erasing surface is placed on and/or in proximity of the writing pad. In some embodiments the sensor may be a proximity sensor, in particular a capacitive, capacitive displacement, doppler effect, inductive, magnetic, hall effect or an optical sensor. In some embodiments the optical sensor may be a photoelectric, photocell, laser rangefinder, passive or a passive thermal infrared optical sensor.

In some embodiments the erasing tool may be configured to supply the voltage or the voltage and current. The erasing tool may comprise the electrical power source. In particular the erasing tool may comprise a primary or secondary battery. Alternatively or additionally, the erasing tool may be connected to the electric power supply.

In some embodiments the erasing tool may comprise an erasing surface, wherein the erasing surface comprises the second electrode. The erasing tool may have a small erasing surface to provide a precise erasing action or a large erasing surface to provide an extensive action. The erasing tool may also comprise both a small and large erasing surface.

In some embodiments the button may be configured to be switched by pressing the erasing surface against the writing surface.

In some embodiments the erasing tool may comprise an eraser configured to detach the ink from the writing surface. In some embodiments the eraser may be a polymer, a foam and/or a fabric. An eraser, for example a conventional eraser, may facilitate detachment of the ink, in particular after the adhesiveness of the bonding agent has been reduced by applying a voltage or voltage and current. The eraser may facilitate the detachment by adhering to the ink and thus, remove the ink from the paper, when the eraser is rubbed against the paper.

In some embodiments the eraser is at least partially encased by the second electrode. When the eraser is at least partially encased by the second electrode, it may be possible to rub the eraser against the ink, while the bonding agent's adhesiveness is reduced. This may reduce the overall time required for erasing the ink.

In some embodiments the erasing tool may comprise an erasing tip made from an electroconductive material. The erasing tip may comprise the second electrode. The erasing tip may reduce the bonding agent's adhesiveness in a smaller area, compared to a second electrode partially encasing an eraser.

In some embodiments the erasing tip may be encased at least partially by the eraser. When the erasing tip is at least partially encased by the eraser, it may be possible to rub the eraser against the ink, while the bonding agent's adhesiveness is reduced. This may reduce the overall time required for erasing the ink.

In some embodiments the writing instrument may comprise an ink outlet. In some embodiments the erasing tool may be comprised within the writing instrument on the opposite side of the ink outlet. In some embodiments the writing instrument may comprise an eraser on the opposite side of the ink outlet. In some embodiments the writing instrument may comprise a cap. In some embodiments the erasing tool may be part of the cap of the writing instrument. Comprising the erasing tool within the writing instrument or parts thereof, e.g. opposite side of the ink outlet or on the cap, may facilitate operating the system by the user, as he/she does not require to switch objects to write and erase.

In an embodiment, the system comprises the writing instrument comprising the ink, wherein the ink comprises the coloring agent and the bonding agent. In the embodiment, the adhesiveness of the bonding agent can be altered by applying a voltage or a voltage and a current. The system according to the embodiment further comprises the writing surface comprising the first electrode, wherein the writing surface is at least partially electroconductive and the erasing tool comprising the second electrode.

In an embodiment, the system comprises the writing instrument comprising the ink, wherein the ink comprises the coloring agent and the bonding agent, wherein the adhesiveness of the bonding agent can be reduced by electrochemical oxidation by applying a voltage or a voltage and a current. The system according to the embodiment further comprises the writing surface comprising the first electrode and the erasing tool comprising the second electrode.

In an embodiment, the system comprises the writing instrument comprising the ink, wherein the ink comprises the coloring agent and the bonding agent, wherein the adhesiveness of the bonding agent can be reduced by electrochemical oxidation by applying a voltage or a voltage and a current. Further, the system according to the embodiment Comprises the writing surface comprising the first electrode, wherein the writing surface is at least partially electroconductive and the erasing tool comprising the second electrode.

In a second aspect, the present disclosure relates to a system comprising a writing instrument. The writing instrument comprises an ink, wherein the ink comprises a coloring agent and a bonding agent. The adhesiveness of the bonding agent can be altered by applying a voltage or a voltage and a current. The system further comprises a writing surface comprising a first electrode and a second electrode.

In some embodiment the system may comprise a multiplicity of first electrodes and second electrodes, wherein the electrodes are configured to apply voltage or voltage and current to the writing surface or parts thereof.

In some embodiments the first and second electrodes may be micropins distributed in the writing surface. The micropins may be pins made from an electroconductive material, in particular a metal, ceramic or polymer. The micropins may pass through both the first and second layer and be connected to an electrical power source below the second layer. Alternatively or additionally, the micropins may be comprised only within the first layer and connected to an electrical power source at edges of the writing surface. Alternatively or additionally, the first layer may be a non-conductive layer. In this case, the voltage or the voltage and the current would only be applied to the (conductive) ink connecting two or more micropins.

A system wherein the first and second electrode are comprised within the writing surface may be used without a dedicated erasing tool. The system may alter the bonding agent's adhesiveness by applying a voltage or voltage and current between the first and second electrode. The voltage and voltage and current may then also be applied to ink present on the surface.

Including a multiplicity of electrodes within the writing surface, in particular micropins, may allow evenly distributed application of voltage or voltage and current. Alternatively or additionally, including a multiplicity of electrodes within the writing surface, in particular micropins, may allow localized application of voltage or voltage and current, if the electrodes can be controlled individually.

In some embodiments, the electrodes, in particular the micropins, may have a diameter of between about 50 microns and about 200 microns. In some embodiments, the electrodes, in particular the micropins, may have a density of up to 100 electrodes per $cm^2$.

In some embodiments the system may be configured to apply voltage or voltage and current in an alternating high frequency between the first and second electrode(s). Applying voltage or voltage and current with alternating high frequency (high frequency alternation) may provide a fast adjustment of the bonding agent's adhesiveness compared to a lower frequency.

In some embodiments the system may comprise a switchable mechanism, in particular a button configured to be switched by an extremity of the user and wherein the switchable mechanism is configured to start the application of the voltage or of the voltage and the current. A system which does not comprise an erasing tool, may still comprise a switchable mechanism to control the application of the voltage or of the voltage and current. The switchable mechanism may only control the application of the voltage or of the voltage and current to certain areas of the writing surface or alternatively may control the application of the voltage or of the voltage and current to entire writing surface.

In some embodiments the system may be configured to apply the voltage or the voltage and the current when a threshold pressure is applied to the writing surface. In particular the micropins may comprise pressure sensors. This may allow to control the voltage or the voltage and current application without an erasing tool or a particular button. Instead the user may press an object, e.g. a part of the writing instrument, on areas where the voltage or the voltage and current shall be applied, to alter the bonding agent's adhesiveness in the specific area, without needing to use an erasing tool or another device comprising an electrode. The pressure threshold may prevent accidentally applying voltage or voltage and current when writing, as a threshold may be chosen which lies above the pressure normally applied during the writing action.

In an embodiment according to the second aspect, the system comprises the writing instrument comprising the ink, wherein the ink comprises the coloring agent and the bonding agent. In the embodiment, the adhesiveness of the bonding agent can be altered by applying a voltage or a voltage and a current. The system according to the embodiment further comprises the writing surface comprising the first electrode and the second electrode, wherein the writing surface is at least partially electroconductive.

In an embodiment according to the second aspect, the system comprises the writing instrument comprising the ink, wherein the ink comprises the coloring agent and the bonding agent. In the embodiment, the adhesiveness of the bonding agent can be reduced by electrochemical oxidation by applying a voltage or a voltage and a current. The system according to the embodiment further comprises the writing surface comprising the first electrode and the second electrode.

In an embodiment according to the second aspect, the system comprises the writing instrument comprising the ink, wherein the ink comprises the coloring agent and the bonding agent. In the embodiment, the adhesiveness of the bonding agent can be reduced by electrochemical oxidation by applying a voltage or a voltage and a current. The system according to the embodiment further comprises the writing surface comprising the first electrode and the second electrode, wherein the writing surface is at least partially electroconductive.

In a third aspect, the present disclosure relates to an erasing tool comprising an electrode and an electrical power source, wherein the erasing tool is configured to apply voltage or voltage and current to a writing surface.

Embodiments disclosed in the first aspect are equally applicable to this aspect.

In a fourth aspect, the present disclosure relates to a writing instrument comprising an ink, wherein the ink comprises a coloring agent and a bonding agent, wherein the adhesiveness of the bonding agent can be altered by applying a voltage or a voltage and a current.

Embodiments disclosed in the first aspect are equally applicable to this aspect.

In a fifth aspect, the present disclosure relates to an ink, wherein the ink comprises a coloring agent and a bonding agent, wherein the adhesiveness of the bonding agent can be altered by applying a voltage or a voltage and a current.

Embodiments disclosed in the first aspect are equally applicable to this aspect.

In a sixth aspect, the present disclosure relates to a writing surface, wherein the writing surface comprises an electrode and wherein the writing surface is at least partially electroconductive, wherein the writing surface is configured to allow reversible adhesion of a bonding agent.

Embodiments disclosed in the first and second aspect are equally applicable to this aspect.

In a seventh aspect, the present disclosure relates to a use of a writing surface in the system according to any preceding aspect, wherein the writing surface is at least partially electroconductive and wherein the writing surface comprises a multiplicity of first electrodes and second electrodes, wherein the electrodes are configured to apply voltage or voltage and current to the writing surface or parts thereof.

Embodiments disclosed in the second aspect are equally applicable to this aspect.

In an eighth aspect, the present disclosure relates to a use of an ink in the system according to any preceding aspect, wherein the ink comprises a coloring agent and a bonding agent, wherein the adhesiveness of the bonding agent can be altered by applying a voltage or a voltage and a current.

Embodiments disclosed in the first and second aspect are equally applicable to this aspect.

Further Embodiments

1. A system comprising:
a writing instrument comprising an ink,
wherein the ink comprises a coloring agent and a bonding agent,
wherein the adhesiveness of the bonding agent can be altered by
applying a voltage or a voltage and a current; and
a writing surface comprising a first electrode; and
an erasing tool comprising a second electrode.

2. The system according to embodiment 1, wherein the first electrode is a cathode, and the second electrode is an anode.

3. The system according to embodiment 1, wherein the first electrode is an anode, and the second electrode is a cathode.

4. The system according to any preceding embodiment, wherein the applied voltage is between about 0.01 V to about 48 V, more specifically between about 0.1 V to about 12 V, and in particular between about 1 V and about 3 V.

5. A system according to any preceding embodiment, wherein the first and or second electrode is a metallic electrode, a carbon-based electrode, a ceramic electrode or a polymeric electrode.

6. The system according to any preceding embodiment, wherein the writing surface is at least partially electroconductive.

7. A system according to any preceding embodiment, wherein the writing surface is a porous writing surface configured to receive the ink comprising the coloring agent and the bonding agent.

8. The system according to any preceding embodiment, wherein the writing surface comprises a paper.

9. The system according to embodiment 8, wherein the paper is electroconductive.

10. The system according to any preceding embodiment, wherein the writing surface comprises a first electroconductive layer and a second non-electroconductive layer.

11. The system according to embodiment 10, wherein the first layer is a coating applied to the second layer or wherein the first layer is bonded by an adhesive layer to the second layer.

12. The system according to any preceding embodiment, wherein the writing surface comprises a thermoplastic polymer, a duromer, wood, cellulose, glass, ceramic, carbon, metal or a combination thereof.

13. A system according to any one of embodiments 10 to 12, wherein the first layer comprises a metal, an electroconductive polymer and/or an electroconductive ceramic.

14. The system according to embodiment 13, wherein the first layer comprises a polymer film, in particular a polypropylene-based film, or a metallic film, in particular an aluminum film.

15. The system according to any preceding embodiment, wherein the writing surface is at least partially electroconductive when applying a voltage of between about 0.01 V to about 48 V, more specifically between about 0.1 V to about 12 V, and in particular between about 1 V and about 3 V.

16. The system according to any preceding embodiment, wherein the writing surface is comprised within a writing board.

17. The system according to any preceding embodiment, wherein the ink comprises a solvent.

18. The system according to embodiment 17, wherein the bonding agent is configured to adhere to the writing surface when the solvent evaporates.

19. The system according to embodiment 17 or 18, wherein the solvent is selected from water, phenoxy ethanol and benzyl alcohol.

20. The system according to any preceding embodiment, wherein the adhesiveness of the bonding agent can be reduced by applying a voltage or a voltage and current.

21. The system according to any preceding embodiment, wherein the bonding agent is oxidized by applying a voltage or a voltage and current.

22. The system according to any preceding embodiment, wherein an electrochemical oxidation of the bonding agent leads to a reduction of its adhesiveness.

23. The system according to any preceding embodiment, wherein the bonding agent crosslinks by applying a voltage or a voltage and current.

24. The system according to embodiment 23, wherein cross-linking of the bonding agent leads to a reduction of its adhesiveness.

25. The system according to embodiment 22, wherein bonding agent comprises hydroxyl-groups and the oxidation of at least a part of the hydroxyl-groups reduces the bonding agent's adhesiveness.

26. The system according to any preceding embodiment, wherein the bonding agent comprises a catechol and/or a catechol derivative, in particular dopamine, polymerized dopamine, dopamine methacrylamide or acetyl dopamine.

27. The system according to any preceding embodiment, wherein the coloring agent comprises a dye.

28. The system according to embodiment 27, wherein the dye is chemically bound to the bonding agent.

29. The system according to embodiment 28, wherein the dye and the bonding agent form a salt.

30. The system according to any preceding embodiment, wherein the coloring agent comprises a pigment.

31. The system according to embodiment 30, wherein the pigment is embedded within the bonding agent after evaporation of the solvent.

32. The system according to any preceding embodiment, wherein the ink comprises a solvent, a thickening agent, and a dye and/or a pigment.

33. The system according to any preceding embodiment, wherein the ink comprises a resin and/or lubricant.

34. The system according to any preceding embodiment, wherein the system further comprises a power source, in particular an electrical power source.

35. The system according to embodiment 34, wherein the electrical power source is an electric battery, in particular a primary or a secondary battery.

36. The system according to embodiment 34, wherein the electrical power source is an electric power supply.

37. The system according to embodiment 36, wherein the electric power supply is connectable to a power grid.

38. The system according to any preceding embodiment, wherein the system comprises an electronic circuit, wherein the writing surface, the first electrode and the second electrode are part of the electronic circuit and wherein the voltage or voltage and current is applied to the electronic circuit or parts thereof.

39. The system according to any preceding embodiment, wherein the system comprises a control system configured to adjust the applied voltage or voltage and current.

40. The system according to embodiment 39, wherein the control system is configured to adjust the voltage or voltage and current applied to the electronic circuit or parts thereof.

41. The system according to embodiment 39 or embodiment 40, wherein the erasing tool comprises a switchable mechanism configured to send a signal to the control system to adjust the applied voltage or voltage and current when the switchable mechanism is actuated.

42. The system according to embodiment 41, wherein the switchable mechanism is configured to send a signal to the control system to switch on the application of a voltage or voltage and current to the electronic circuit when the switchable mechanism is actuated.

43. The system according to embodiments 41 or 42, wherein the switchable mechanism is configured to close the electronic circuit when the switchable mechanism is actuated and wherein the closure of the electronic circuit leads to application of the voltage or voltage and current.

44. The system according to any one of embodiments 41 to 43, wherein switchable mechanism comprises a button.

45. The system according to embodiment 44, wherein the button is configured to be switched by an extremity of the user, in particular a finger or the palm of the hand.

46. The system according to any one of embodiments 41 to 43, wherein the switchable mechanism comprises a sensor, wherein the sensor is configured to send a signal to adjust the applied voltage or voltage and current to the control system when the erasing surface is placed on and/or in proximity of the writing pad.

47. The system according to embodiment 46, wherein the sensor is a proximity sensor, in particular a capacitive, capacitive displacement, doppler effect, inductive, magnetic, hall effect or an optical sensor.

48. The system according to embodiment 47, wherein the optical sensor is a photoelectric, photocell, laser rangefinder, passive or a passive thermal infrared optical sensor.

49. The system according to any preceding embodiment, wherein the erasing tool is configured to supply the voltage or the voltage and current.

50. The system according to any preceding embodiment, wherein the erasing tool comprises an erasing surface, wherein the erasing surface comprises the second electrode.

51. The system according to embodiment 50, wherein the button is configured to be switched by pressing the erasing surface against the writing surface.

52. The system according to any preceding embodiment, wherein the erasing tool comprises an eraser configured to detach the ink from the writing surface.

53. The system according to embodiment 52, wherein the eraser is a polymer, a foam and/or a fabric.

54. The system according to embodiments 52 or 53, herein the eraser is at least partially encased by the second electrode.

55. The system according to any one of embodiments 52 to 54, wherein the erasing tool comprises an erasing tip made from an electroconductive material.

56. The system according to any embodiment 55, wherein the erasing tip is encased at least partially by the eraser.

57. The system according to any preceding embodiment, wherein the writing instrument comprises an ink outlet.

58. The system according to embodiment 57, wherein the erasing tool is comprised within the writing instrument on the opposite side of the ink outlet.

59. The system according to embodiment 57 or 58, wherein the writing instrument comprises an eraser on the opposite side of the ink outlet.

60. The system according to any preceding embodiment, wherein the writing instrument comprises a cap.

61. The system according to embodiment 60, wherein the erasing tool is part of the cap of the writing instrument.

62. A system comprising:
a writing instrument comprising an ink,
wherein the ink comprises a coloring agent and a bonding agent,
wherein the adhesiveness of the bonding agent can be altered by
applying a voltage or a voltage and a current; and
a writing surface comprising a first electrode and a second electrode.

63. The system according to embodiment 62, wherein the system comprises a multiplicity of first electrodes and second electrodes, wherein the electrodes are configured to apply voltage or voltage and current to the writing surface or parts thereof.

64. The system according to embodiment 63, wherein the first and second electrodes are micropins distributed in the writing surface.

65. The system according to any preceding embodiment, wherein the system is configured to apply voltage or voltage and current in an alternating high frequency between the first and second electrode(s).

66. The system according to any one of embodiments 62 to 65, wherein the system comprises a switchable mechanism, in particular a button configured to be switched by an extremity of the user and wherein the switchable mechanism is configured to start the application of the voltage or of the voltage and the current.

67. The system according to any one of embodiments 62 to 66, wherein the system is configured to apply the voltage or the voltage and the current when a threshold pressure is applied to the writing surface.

68. An erasing tool comprising an electrode and an electrical power source, wherein the erasing tool is configured to apply voltage or voltage and current to a writing surface.

69. A writing instrument comprising an ink, wherein the ink comprises a coloring agent and a bonding agent, wherein the adhesiveness of the bonding agent can be altered by applying a voltage or a voltage and a current.

70. An ink,
wherein the ink comprises a coloring agent and a bonding agent,
wherein the adhesiveness of the bonding agent can be altered by applying a voltage or a voltage and a current.

71. The ink according to embodiment 70, wherein the ink comprises a solvent.

72. The ink according to embodiments 70 or 71, wherein the bonding agent is configured to adhere to the writing surface when the solvent evaporates.

73. The ink according to embodiments 71 or 72, wherein the solvent is selected from water, phenoxy ethanol and benzyl alcohol.

74. The ink according to any one of embodiments 70 to 73, wherein the adhesiveness of the bonding agent can be reduced by applying a voltage or a voltage and current.

75. The ink according to any one of embodiments 70 to 74, wherein the bonding agent is oxidized by applying a voltage or a voltage and current.

76. The ink according to any one of embodiments 70 to 75, wherein an electrochemical oxidation of the bonding agent leads to a reduction of its adhesiveness.

77. The ink according to any one of embodiments 70 to 76, wherein the bonding agent crosslinks by applying a voltage or a voltage and current.

78. The ink according to embodiment 77, wherein crosslinking of the bonding agent leads to a reduction of its adhesiveness.

79. The ink according to any one of embodiments 70 to 78, wherein bonding agent comprises hydroxyl-groups and the oxidation of the hydroxyl-groups reduces the bonding agent's adhesiveness.

80. The ink according to any one of embodiments 70 to 79, wherein the bonding agent comprises a catechol and/or a catechol derivative, in particular dopamine, polymerized dopamine, dopamine methacrylamide or acetyl dopamine.

81. The ink according to any one of embodiments 70 to 80, wherein the coloring agent comprises a dye.

82. The ink according to embodiment 81, wherein the dye is chemically bound to the bonding agent.

83. The ink according to embodiment 81 or 82, wherein the dye and the bonding agent form a salt.

84. The ink according to any one of embodiments 70 to 83, wherein the coloring agent comprises a pigment.

85. The ink according to embodiment 84, wherein the pigment is embedded within the bonding agent after evaporation of the solvent.

86. The ink according to any one of embodiments 70 to 85, wherein the ink comprises a solvent, a thickening agent, and a dye and/or a pigment.

87. The ink according to any one of embodiments 70 to 86, wherein the ink comprises a resin and/or lubricant.

88. A writing surface,
wherein the writing surface comprises an electrode and wherein the writing surface is at least partially electroconductive,
wherein the writing surface is configured to allow reversible adhesion of a bonding agent.

The invention claimed is:

1. A system comprising:
a writing instrument comprising an ink,
wherein the ink comprises a coloring agent and a bonding agent,
wherein an adhesiveness of the bonding agent can be altered by applying a voltage or a voltage and a current;
a writing surface comprising a first electrode; and
an erasing tool comprising a second electrode.

2. The system according to claim 1, wherein the applied voltage is between about 0.01 V to about 48 V.

3. The system according to claim 1, wherein the writing surface is at least partially electroconductive.

4. The system according to claim 1, wherein the writing surface is a porous writing surface configured to receive the ink comprising the coloring agent and the bonding agent.

5. The system according to claim 1, wherein an electrochemical oxidation of the bonding agent leads to a reduction of its adhesiveness.

6. The system according to claim 1, wherein the bonding agent comprises a catechol and/or a catechol derivative.

7. The system according to claim 1, wherein the bonding agent comprises dopamine, polymerized dopamine, dopamine methacrylamide or acetyl dopamine.

8. The system according to claim 1, wherein the coloring agent comprises a dye.

9. The system according to claim 1, wherein the coloring agent comprises a dye which may form a salt with the bonding agent.

10. The system according to claim 1, wherein the ink comprises a solvent, wherein the coloring agent comprises a pigment, and wherein the pigment is embedded within the bonding agent after evaporation of the solvent.

11. The system according to claim 1, wherein the erasing tool comprises a switchable mechanism configured to send a signal to a control system to adjust the applied voltage or voltage and current when the switchable mechanism is actuated.

12. The system according to claim 1, wherein the writing instrument is a handheld writing instrument.

13. The system according to claim 1, wherein the bonding agent comprises a catechol and/or a catechol derivative.

14. The system according to claim 1, wherein the bonding agent comprises dopamine, polymerized dopamine, dopamine methacrylamide or acetyl dopamine.

15. The system according to claim 1, wherein the coloring agent comprises a dye.

16. The system according to claim 1, wherein the coloring agent comprises a dye which may form a salt with the bonding agent.

17. A system comprising:
   a writing instrument comprising an ink,
wherein the ink comprises a coloring agent and a bonding agent, and
wherein an adhesiveness of the bonding agent can be altered by applying a voltage or a voltage and a current; and
   a writing surface comprising a first electrode and a second electrode,
wherein the writing surface comprises a multiplicity of first electrodes and second electrodes, wherein the multiplicity of first electrodes and second electrodes are configured to apply either voltage or voltage and current to at least a part of the writing surface, and wherein the multiplicity of first electrodes and second electrodes include micropins distributed in the writing surface.

* * * * *